(12) United States Patent
Goutelard et al.

(10) Patent No.: US 8,090,531 B2
(45) Date of Patent: Jan. 3, 2012

(54) METHOD FOR ASSISTING AN AIRCRAFT TO REJOIN A FLIGHT PLAN BY INTERCEPTION OF A FLIGHT SEGMENT CLOSE TO THE AIRCRAFT

(75) Inventors: Hervé Goutelard, Juan les Pins (FR); François Coulmeau, Seilh (FR); Stéphane Paris, Tournefeuille (FR)

(73) Assignee: Thales (FR)

( * ) Notice: Subject to any disclaimer, the term of this patent is extended or adjusted under 35 U.S.C. 154(b) by 656 days.

(21) Appl. No.: 12/209,465

(22) Filed: Sep. 12, 2008

(65) Prior Publication Data

US 2009/0076717 A1 Mar. 19, 2009

(30) Foreign Application Priority Data

Sep. 14, 2007 (FR) ...................................... 07 06469

(51) Int. Cl.
*G01C 21/00* (2006.01)
(52) U.S. Cl. ........................................ 701/205; 701/206
(58) Field of Classification Search .................. 701/3, 4, 701/120, 122, 205, 206
See application file for complete search history.

(56) References Cited

U.S. PATENT DOCUMENTS

| | | | | |
|---|---|---|---|---|
| 5,631,640 A | * | 5/1997 | Deis et al. .................. | 340/961 |
| 5,646,854 A | * | 7/1997 | Bevan ........................ | 701/206 |
| 5,797,106 A | * | 8/1998 | Murray et al. .............. | 701/11 |
| 6,163,744 A | * | 12/2000 | Onken et al. ............... | 701/3 |
| 6,266,610 B1 | * | 7/2001 | Schultz et al. .............. | 701/201 |
| 6,922,631 B1 | * | 7/2005 | Dwyer et al. ............... | 701/206 |
| 7,024,287 B2 | * | 4/2006 | Peckham et al. ............ | 701/3 |
| 7,089,091 B2 | * | 8/2006 | Artini et al. ................ | 701/3 |
| 7,269,486 B2 | * | 9/2007 | Artini ......................... | 701/3 |
| 7,363,152 B2 | * | 4/2008 | Sjanic ......................... | 701/209 |
| 2009/0076721 A1 | * | 3/2009 | Coulmeau et al. .......... | 701/206 |

FOREIGN PATENT DOCUMENTS

| | | |
|---|---|---|
| EP | 1598719 A1 | 11/2005 |
| WO | 2005012837 A1 | 2/2005 |

* cited by examiner

*Primary Examiner* — Joseph C Rodriguez
(74) *Attorney, Agent, or Firm* — Lowe Hauptman Ham & Berner, LLP (57) ABSTRACT

A method for assisting an aircraft to rejoin a flight plan is disclosed. The flight plan is composed of a number N of flight segments ($LEG_i$, $i \in [1, N]$) with a flight segment $LEG_i$ being defined by a departure end ($WPT_{i-1}$) and by an arrival end ($WPT_i$). A navigation mode is termed "managed mode" wherein, the aircraft has momentarily left the managed mode and has deviated from the flight plan after passing through a waypoint ($WPT_p$, $p \in [1, N]$), the aircraft occupying a position (PPOS) and seeking to rejoin the flight plan so as to follow it in managed mode. The method comprises a step of evaluating the separation distance ($D_j$, $i \in [p+1, N]$) between the position (PPOS) of the aircraft and each of the waypoints ($WPT_j$, $i \in [p+1, N]$). The local minima of the distance between the position (PPOS) of the aircraft and the waypoints ($WPT_j$, $i \in [p+1, N]$) of the flight plan is determined.

15 Claims, 5 Drawing Sheets

METHOD FOR ASSISTING AN AIRCRAFT TO REJOIN A FLIGHT PLAN BY INTERCEPTION OF A FLIGHT SEGMENT CLOSE TO THE AIRCRAFT

RELATED APPLICATIONS

The present application is based on, and claims priority from, French Application Number 07 06469, filed Sep. 14, 2007, the disclosure of which is hereby incorporated by reference herein in its entirety.

TECHNICAL FIELD

The field of the invention is that of the rejoining by an aircraft of a predefined trajectory assigned to the aircraft. The invention relates more specifically to a method for an aircraft to rejoin a flight plan defined in a flight management system of the aircraft from any point in space situated off the flight plan.

BACKGROUND OF THE INVENTION

Current aircraft exhibit three levels of piloting equipment:
a first level of equipment consisting of the flight controls acting directly on the control surfaces and engines,
a second level of equipment consisting of the automatic pilot and/or flight director acting on the flight controls, directly for the automatic pilot or by way of the pilot for the flight director, so as to slave the aircraft to a flight parameter such as for example, heading, roll, pitch, altitude, speed, etc, and
a third level of equipment consisting of the flight management computer known by the initials FMS derived from the expression "Flight Management System" capable of formulating a flight plan and of acting on the automatic pilot or the flight director so as to make the aircraft follow it.

The FMS flight management computer, hereinafter called the FMS flight computer, has, among other main functions: the formulation and automatic tracking of a flight plan, a flight plan being composed of the lateral and vertical trajectories that must be followed by the aircraft to go from the position that it occupies to its destination, as well as travel speeds along these trajectories.

The formulation of a flight plan is done inter alia, on the basis of imposed waypoints optionally associated with time, altitude and speed constraints. These imposed waypoints and their associated constraints are introduced, into the FMS flight computer, by an operator of the aircraft, for example an aircraft crew member, by means of an item of equipment of the flight deck with keyboard and screen ensuring the man-machine interface such as that known by the abbreviation MCDU standing for: "Multipurpose Control and Display Unit". The formulation of the flight plan proper consists in constructing the lateral and vertical trajectories of the flight plan on the basis of a chaining of "flight segments" $LEG_i$ (or "Legs") each identified by a flight segment index i defining an order in the flight plan. The flight plan starts from a departure point, passes through imposed waypoints, and finishes at an arrival point, while complying with standardized construction rules and while taking account of time, altitude and speed constraints optionally associated with each imposed waypoint. A flight segment $LEG_i$ is delimited by a departure Waypoint $WPT_{i-1}$ and an arrival Waypoint $WPT_i$.

During an aircraft flight, the FMS plays a central role in the control of the trajectory. It is the nerve centre of this command. During navigation carried out under the command of the FMS, one speaks of navigation in "managed" mode: the FMS controls the automatic pilot and optionally the auto-throttle.

In "managed" mode, the leg $LEG_i$ which is followed by the aircraft is called the "active leg": the aircraft then steers towards the arrival Waypoint $WPT_i$, that is to say the end terminating the active leg.

According to a predefined criterion of proximity of the aircraft and of the arrival Waypoint of the active leg, a transition is carried out so as to follow the flight plan stage by stage. This transition consists in modifying the current active leg $LEG_i$ and in considering the leg which follows $LEG_i$ in the flight plan, that is to say $LEG_{i+1}$, to be the new active leg.

Once the condition or conditions of the predefined criterion are fulfilled, the current active leg is modified: $LEG_{i+1}$ then becomes the active leg, until the condition or conditions of the predefined criterion are again fulfilled with $WPT_{i+1}$ and so on and so forth as the aircraft passes in proximity to the various Waypoints which make up the flight plan.

When an aircraft has interrupted a managed navigation mode, the flight plan is no longer necessarily followed by the aircraft. This is the case, for example, when piloting "with the stick" or when the aircraft is in "selected" mode: in this navigation mode, the aircraft pilot transmits lateral, and optionally vertical, displacement and speed setpoints directly to the automatic pilot and to the throttle. Thus, the aircraft may deviate considerably from the trajectory defined in the flight plan stored in the FMS.

When the pilot of the aircraft wishes to rejoin the trajectory of the flight plan, it is not always possible for him to rejoin the trajectory of the flight plan by passing back directly to managed mode. This difficulty may stem, for example, from a significant lateral gap between the aircraft and the current active leg. Specifically, in managed mode, the aircraft will have a tendency to rejoin the arrival Waypoint $WPT_i$ of the last active leg $LEG_i$, which is not always possible.

Now, depending on the operating mode of the FMS, when a waypoint $WPT_i$ cannot be rejoined, neither can the subsequent waypoints of the flight plan and the active leg remains stuck on the leg terminating at $WPT_i$.

The freezing of the active leg also has consequences in relation to air traffic control: specifically, an increasing number of surveillance systems currently call upon digital data links (Datalink). Aircraft regularly send the control centres the position of the aircraft as well as its two scheduled passing positions (ADS application, the initials standing for Automatic Dependent Surveillance) through digital data links. The freezing of the leg causes erroneous data to be transmitted to the air traffic control.

Additionally, an increasing number of aircraft are equipped with automatic report applications allowing the operational centres of airlines (AOC centres) to monitor, in real time, the utilization of aircraft. Thus, with each logging point sequencing, the aircraft sends an electronic message to its company. Here again, point non-sequencing makes it impossible for the company to follow in real time the route of the aircraft.

This difficulty can be solved through manual intervention by the pilot who directly modifies the flight plan by eliminating one by one the Waypoints situated upstream of the Waypoint $WPT_p$ chosen by the pilot to rejoin the flight plan.

This manual intervention by the pilot generates a considerable workload: in certain situations, the active leg is separated from the leg to be rejoined by a large number of legs in the flight plan, thereby consequently requiring a large number of manual eliminations of Waypoints.

Additionally, input errors by the pilot are always possible in particular in a case where the Waypoints have mutually close identifiers. This is the case for example for Waypoints during ocean crossings.

Finally, the manual interventions are currently performed "head-down" thereby requiring great vigilance on the part of the crew which is not always compatible with the piloting tasks.

The main defect therefore stems from the fact that there is no automatic mechanism allowing the FMS to return to navigation in managed mode, and therefore that the pilot is induced to carry out multiple operations with this aim.

SUMMARY OF THE INVENTION

The aim of the invention is to alleviate these drawbacks.

More precisely, the subject of the invention is a method making it possible to define a potential LEG which is the input LEG whereby the aircraft enters the flight plan when the crew wishes to rejoin the flight plan. This potential LEG is chosen according to a criterion regarding the distance between the aircraft and the various waypoints of the flight plan. The benefit of such a solution is to make it possible to change the state of the current active LEG upstream of the point at which the aircraft homes in on the flight plan so as to render the potential LEG active as soon as a zone close to the flight plan is crossed, after the crew confirms engagement of the managed mode.

Furthermore, another benefit of such a solution is to be able to automatically delete the waypoints preceding the homing point of the flight plan, deactivate the active state of the LEG that the aircraft has left so as to deviate from the flight plan and finally to activate the LEG by which the aircraft has rejoined the flight plan, these actions being done without having to perform a manual input into the flight management interface.

Advantageously, the method for assisting an aircraft to rejoin a flight plan relates to a flight plan defining a path to be followed by the aircraft so as to link a departure airport AD to a destination airport AA, the flight plan being composed of a number N of segments $LEG_i$, the flight segment $LEG_i$ being defined by a departure end called a waypoint $WPT_{i-1}$ and by an arrival end called $WPT_i$, $WPT_0$ corresponding to a geographical departure position, $WPT_N$ being a geographical arrival position, a waypoint $WPT_i$ being removed from the flight plan once the aircraft has passed through the waypoint $WPT_i$, in a navigation mode termed "managed mode", the aircraft steering towards the waypoint whose index is a minimum, the aircraft having momentarily left the managed mode and having deviated from the flight plan after passing through a waypoint $WPT_{p-1}$, the aircraft occupying a position PPOS and seeking to rejoin the flight plan so as to follow it in managed mode, the method comprising a step of evaluating the separation distance $D_j=D(PPOS, WPT_j)$ between the position PPOS of the aircraft and the waypoints $WPT_j$ for any index j lying between p and N.

An advantage of the method is that it comprises, furthermore, a step of determining auxiliary indices k lying between p+1 and N-1 for which the separation distance $D_k=Dist(PPOS, WPT_k)$ between the position PPOS of the aircraft and the waypoint $WPT_k$ is less than $D_{k-1}$ and than $D_{k+1}$.

Advantageously, the separation distance $D_j=D(PPOS, WPT_j)$ between the position PPOS of the aircraft and a waypoint $WPT_j$ corresponds to a distance measurement in a vertical plane.

Advantageously, the separation distance $D_j=D(PPOS, WPT_j)$ between the position PPOS of the aircraft and a waypoint $WPT_j$ is a distance measurement in a horizontal plane.

Advantageously, the separation distance $D_j=D(PPOS, WPT_j)$ between the position PPOS of the aircraft and a waypoint $WPT_j$ is a measurement of Euclidean distance type in a 3-dimensional space.

Advantageously, the method comprises, furthermore, a step of determining a rejoining index $k_{NST}$ from among the auxiliary indices k so as to define a $LEG_{k_{NST}}$, termed potential, on the basis of which a new flight plan is established when the aircraft passes in proximity to the $LEG_{k_{NST}}$.

Advantageously, the step of determining the rejoining index $k_{NST}$ consists in determining $k_{NST}$ as a minimum of the auxiliary indices k.

Advantageously, a first rejoining distance $D_{rej(k_{NST})}$ is calculated automatically by the FMS between the position PPOS of the aircraft and the waypoint $WPT_{k_{NST}}$.

Advantageously, a second rejoining distance $D_{rej(k_{NST}+1)}$ is calculated automatically by the FMS between the position PPOS of the aircraft and the waypoint $WPT_{k_{NST}+1}$.

Advantageously, the minimum of the first and the second distance is determined, denoted $D_{rej(min)}$.

Advantageously, a third rejoining distance $D_{rej(k_{NST}+2)}$ is calculated automatically by the FMS between the position PPOS of the aircraft and the waypoint $WPT_{k_{NST}+2}$.

Advantageously, the third distance is compared with a fourth distance obtained by summing the distance $D_{rej(min)}$ and the distance $Dist(WPT_{k_{NST}+1}, WPT_{k_{NST}+2})$, the shorter distance from among the third and the fourth distance being chosen so as to rejoin the flight plan.

Advantageously, if there is a lateral discontinuity between the waypoints $WPT_{k_{NST}-1}$ and $WPT_{k_{NST}}$, then the third distance $D_{rej(k_{NST}+2)}$ is compared with a fifth distance by summing the second distance $D_{rej(k_{NST}+1)}$ and the distance $Dist(WPT_{k_{NST}+1}, WPT_{k_{NST}+2})$, the shorter distance from among the third and the fifth distance being chosen so as to rejoin the flight plan.

Advantageously, the automatic calculation of the rejoining distance by the FMS comprises a first trajectory part calculated with heading fixed towards the downstream waypoint of the selected rejoining LEG and a second part is calculated with heading fixed according to a predetermined angle with the selected rejoining LEG.

Advantageously, the predetermined angle is 45°.

Advantageously, the method comprises, furthermore, when the operator of the aircraft has accepted the rejoining proposal and when the aircraft has passed through the waypoint $WPT_{k_{NST}}$, a step of substituting the current flight plan ($WPT_p, WPT_{p+1}, \ldots, WPT_N$) by a new flight plan ($WPT_{k_{NST}+1}, WPT_{k_{NST}+2}, \ldots, WPT_N$), the potential $LEG_{k_{NST}}$ becoming the active LEG.

Advantageously, the method comprises, furthermore, when the operator of the aircraft has accepted the rejoining proposal and when the aircraft has crossed the sequencing plane of the $LEG_{k_{NST}(min)}$, the latter being the plane perpendicular to the $LEG_{k_{NST}(min)}$ passing through the downstream end of the $LEG_{k_{NST}(min)}$, $k_{NST}(min)$ being the minimum index of the auxiliary indices, a step of substituting the current flight plan ($WPT_p, WPT_{p+1}, \ldots, WPT_N$) with a new flight plan ($WPT_{k_{NST}+2}, WPT_{k_{NST}+2}, \ldots, WPT_N$), the potential $LEG_{k_{NST}}$ becoming the active LEG.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
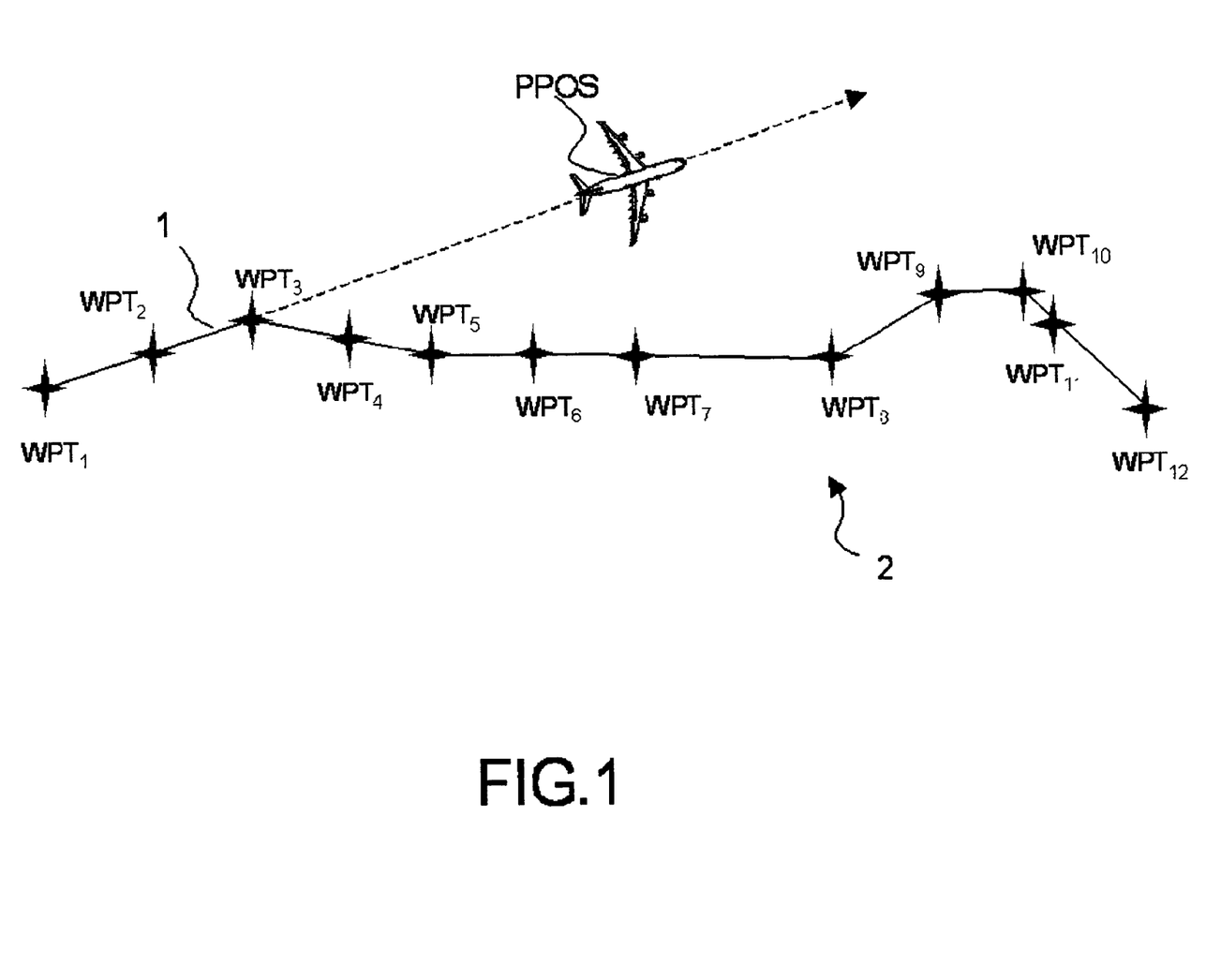
FIG. 1 represents a flight plan from which the aircraft has strayed.

FIG. 1 represents an aircraft in a position PPOS in space which has deviated from a flight plan 2, the flight plan comprising in this example twelve waypoints $[WPT_i]_{i \in [1,12]}$. An aircraft may be led to deviate from a flight plan for various reasons following a decision by the crew. In practice the latter switches to selected mode, that is to say to manual piloting and therefore leaves the managed mode, that is to say automatic piloting. While deviating from the flight plan 2, the LEG 1 remains in the active state waiting for the managed mode to be re-engaged.

An aim of the invention consists in defining an automatic method for escorting the aircraft back onto the flight plan 2 by arming the managed mode. The method makes it possible to calculate the best rejoining trajectory as a function of the distance between the current position of the aircraft and certain significant waypoints of the flight plan, while favouring notably the shortest distance traveled to achieve the flight plan.

The method finally makes it possible to engage the managed mode on approaching the flight plan and to redefine the flight plan from the rejoined LEG.

A first step of the method consists in calculating distance potential wells, subsequently called "local minimum". These are defined by a distance, generally denoted Dist (x,y) for a distance between a point x and a point y, between the current position of the aircraft and a waypoint of the flight plan in such a manner that for three consecutive waypoints of the flight plan, the following two conditions are satisfied:

(A) Dist (PPOS, $WPT_i$)<Dist (PPOS, $WPT_{i+1}$), and
(B) Dist (PPOS, $WPT_i$)<Dist (PPOS, $WPT_{i-1}$)

The indices i−1, i and i+1 conveying the sequencing of a triplet of consecutive waypoints of the flight plan. Under these conditions, subsequently in the description, $WPT_i$ will be said to be a local minimum.

The distance Dist (PPOS, WPTi) is also denoted $D_i$ subsequently.

The method makes it possible to test these two conditions on all the waypoints of the flight plan or on a predefined portion of the flight plan.

Figure 2:
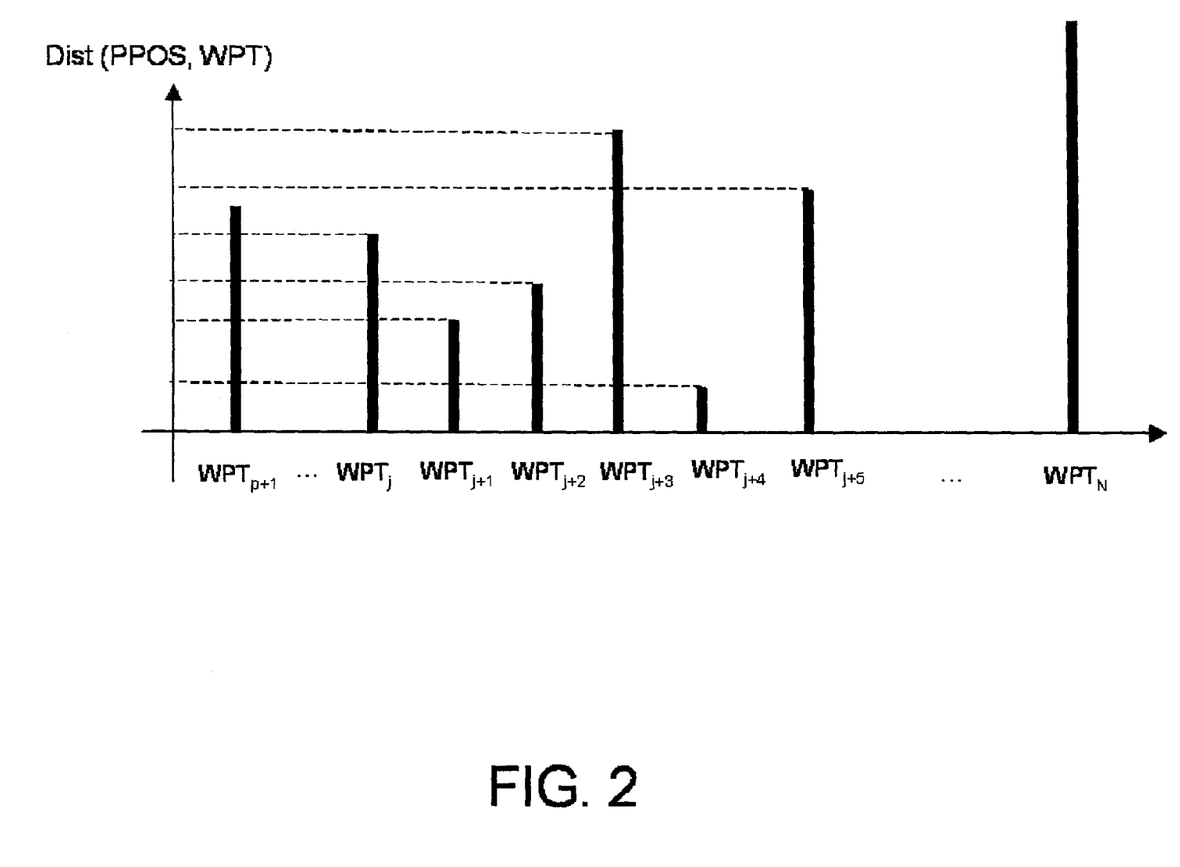
FIG. 2 represents in histogram form an evolution of the distance separating the position of an aircraft PPOS from the various Waypoints $WPT_i$ of a flight plan.

FIG. 2 illustrates in a graphic the distances between the current position of an aircraft PPOS and the various waypoints of a flight plan. The ordinate represents the distance $D_i$ for $i \subset [p+1, N]$ where p is the index of the waypoint corresponding to the upstream end of the current active LEG and N is the index of the last waypoint of the flight plan.

The step of determining the local minima consists in verifying conditions (A) and (B) for each triplet of successive waypoints of the flight plan.

The set of waypoints satisfying these conditions at a given instant forms the set of local minima. The distance between the position of the aircraft at a given instant and between each identified local minimum is denoted $D_{ML}(i)$ for $i \subset [p+1, N]$.

In the example of FIG. 2, the waypoints $WPT_{j+1}$ and $WPT_{j+4}$ are local minima.

Depending on whether there is a single or several local minima, the method comprises an additional step in the case where several local minima are identified.

Figure 3:
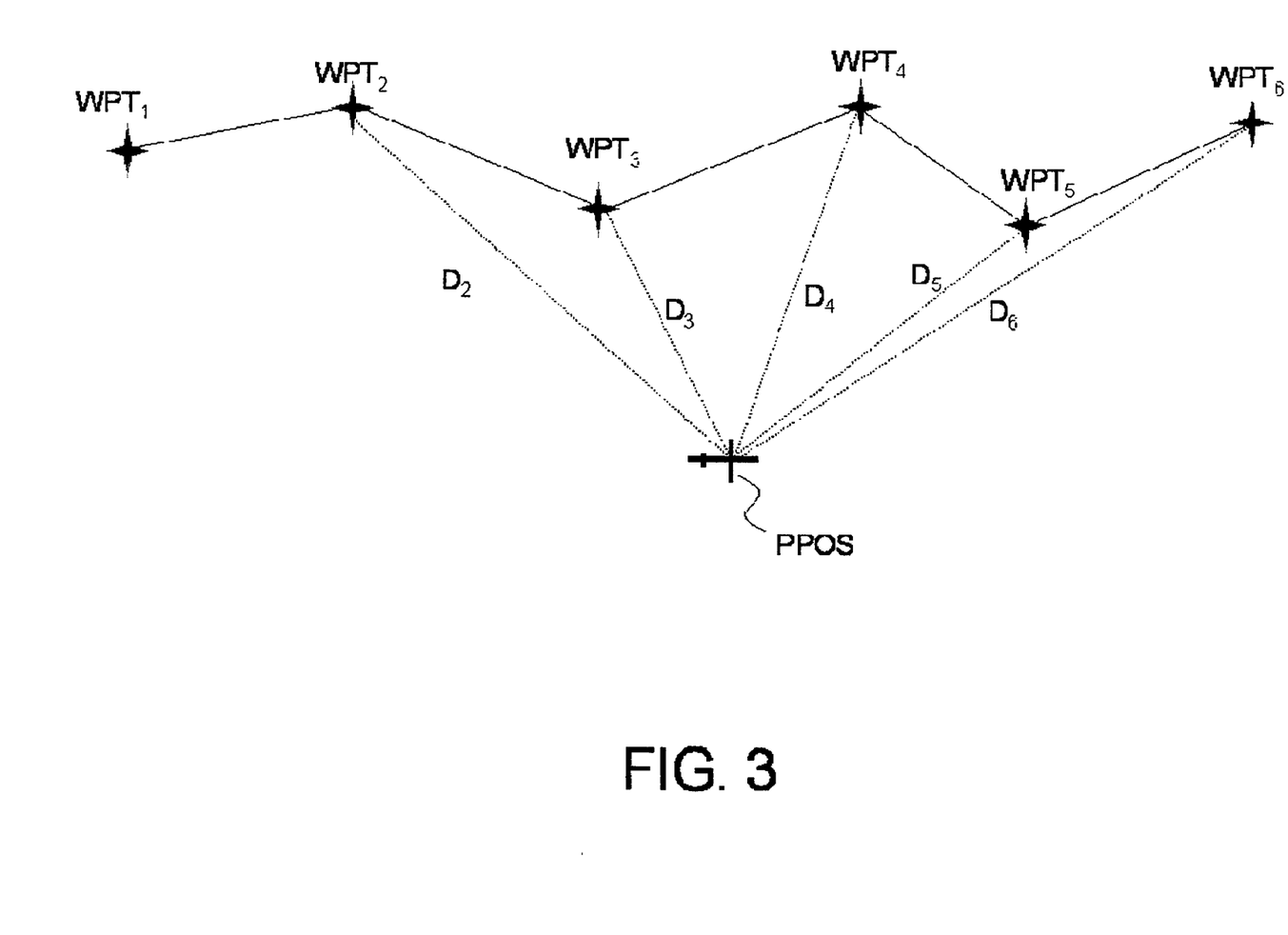
FIG. 3 illustrates a case where two local minima are identified.

FIG. 3 represents a portion of a flight plan comprising several waypoints, including waypoints $WPT_1$, $WPT_2$, $WPT_3$, $WPT_4$, $WPT_5$, $WPT_6$. This portion of the flight plan does not necessarily correspond to the notation of the example of FIG. 2. The aircraft being situated at a given instant at the point PPOS, only two waypoints $WPT_3$ and $WPT_5$ comply with conditions (A) and (B) and are therefore local minima.

Figure 4:
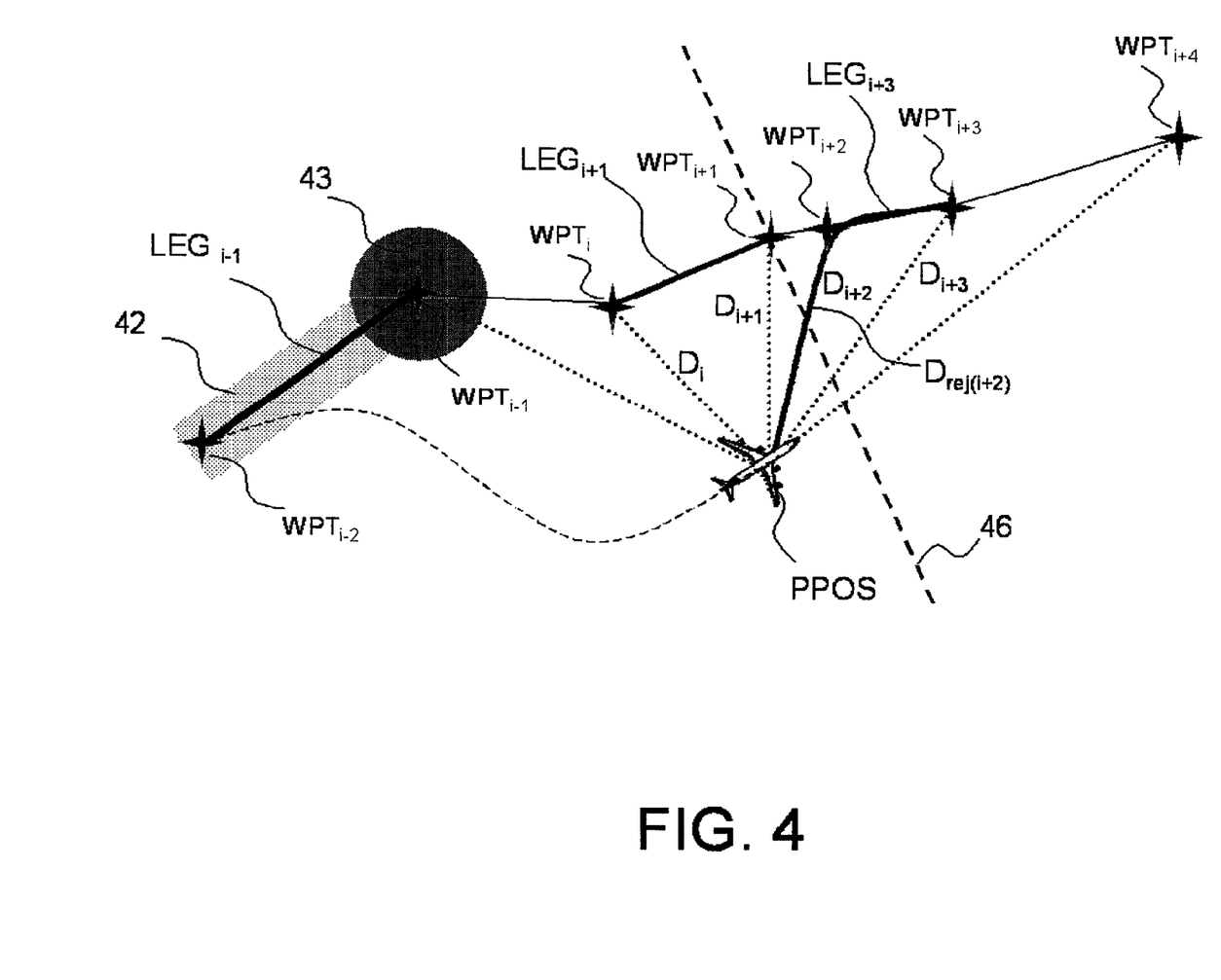
FIG. 4 illustrates an exemplary rejoining flight plan according to a method according to the invention in a view from above.

FIG. 4 represents on the other hand the case of a single identified local minimum meeting conditions (A) and (B). The waypoints are then denoted in this example $WPT_{i-2}$, $WPT_{i-1}$, $WPT_i$, $WPT_{i+1}$, $WPT_{i+2}$, $WPT_{i+3}$ and $WPT_{i+4}$. The aircraft having left $LEG_{i-1}$ still active, when the latter has deviated from the corridor 42, that is to say from the air corridor, the selected mode is engaged (manual mode). FIG. 4 illustrates the case where, subsequently, the aircraft wishes to rejoin the flight plan from its current position.

In this example, the distances $D_3$, $D_4$, $D_5$, $D_6$ represent the distances between on the one hand the position PPOS of the aircraft and the waypoints $WPT_i$, $WPT_{i+1}$, $WPT_{i+2}$, $WPT_{i+3}$ respectively. The single local minimum in this example is established for the waypoint $WPT_i$.

In the present description, the case of a unique identified local minimum is detailed first, the case of several identified local minima is described subsequently.

If a unique local minimum meets conditions (A) and (B) of the flight plan, then the method makes it possible to define a step of determining the optimal rejoining LEG.

This step comprises an analysis of the lateral discontinuities of the anterior waypoints and those following the local minimum.

A first case is that corresponding to no lateral discontinuity between the points $WPT_{i-1}$, $WPT_i$ and $WPT_{i+1}$, a second case corresponds to a lateral discontinuity between the waypoints $WPT_{i-1}$ and $WPT_i$, and finally a third case corresponds to the case of a lateral discontinuity between the waypoints $WPT_i$ and $WPT_{i+1}$.

The determination of the LEG for rejoining the flight plan and the calculated rejoining trajectory depend on these three typical cases.

In the first case, the method establishes a rejoining trajectory on the LEGS $[WPT_{i-1};WPT_i]$, denoted $LEG_i$, and $[WPT_i;WPT_{i+1}]$, denoted $LEG_{i+1}$. $LEG_i$ joins the waypoints $WPT_{i-1}$ and $WPT_i$ and $LEG_{i+1}$ joins the waypoints $WPT_i$ and $WPT_{i+1}$. To establish these two trajectories and the calculation of the distance to be traveled to rejoin the flight plan in the two cases, an existing function of the FMS called "DIRECT TO" makes it possible to establish the rejoining trajectory by calculating notably the heading and the distance to be traveled. The distance for rejoining the flight plan via $LEG_i$ is denoted $D_{rej(i)}$ and the distance for rejoining the flight plan via $LEG_{i+1}$ is denoted $D_{rej(i+1)}$. In both cases the rejoining distances are established respectively on the basis of the functions "DIRECT TO $WPT_i$" and "DIRECT TO $WPT_{i+1}$".

The trajectory established by the "DIRECT TO" function applied to a waypoint of the flight plan is generally composed of a first straight line part with heading fixed towards the upstream waypoint of the LEG and of a second part forming the turn allowing insertion into the flight plan. This distance is named Drej(i) for $WPT_i$.

Initially, the method according to the invention makes it possible to retain a first LEG, termed candidate, from among $LEG_i$ and $LEG_{i+1}$ for which the rejoining distance is the shorter. Under these conditions $D_{rej(min)}=\min\{D_{rej(i)}; D_{rej(i+1)}\}$.

Subsequently, if there is an absence of discontinuity between the waypoints $WPT_{i+1}$ and $WPT_{i+2}$, the method makes it possible to calculate the rejoining distance $D_{rej(i+2)}$ for the waypoint $WPT_{i+2}$ through the FMS "DIRECT TO" function applied to the waypoint $WPT_{i+2}$.

If the distance $D_{rej(i+2)}$ is less than the sum of the rejoining distance $D_{rej(min)}$ and of the distance($WPT_{i+1}$;$WPT_{i+2}$), then the method determines the rejoining trajectory as being that making it possible to rejoin the point $WPT_{i+2}$ at the level of LEG i+2.

If the distance $D_{rej(i+2)}$ is greater than the sum of the rejoining distance $D_{rej(min)}$ and of the distance($WPT_{i+1}$;$WPT_{i+2}$), then the method favours the distance $D_{rej(min)}$ so as to rejoin $LEG_i$ or $LEG_{i+1}$ as the case may be, the minimum rejoining distance.

In the example of FIG. 4 the LEG for rejoining the flight plan is $LEG_{i+3}$ joining the waypoints $WPT_{i+2}$ and $WPT_{i+3}$.

In the second case, if there is lateral discontinuity between $WPT_{i-1}$ and $WPT_i$, then the method executes the DIRECT TO function on the waypoint $WPT_{i+1}$ so as to calculate the rejoining distance $D_{rej(i+1)}$ for the waypoint $WPT_{i+1}$.

In order to compare this first distance so as to perform the best approach, in the absence of discontinuity between $WPT_{i+1}$ and $WPT_{i+2}$, the method executes a "DIRECT TO" on the waypoint $WPT_{i+2}$ so as to calculate the rejoining distance $D_{rej(i+2)}$ for the waypoint $WPT_{i+2}$.

If the distance $D_{rej(i+2)}$ is less than the sum of the rejoining distance $D_{rej(i+1)}$ for $WPT_{i+1}$ and the distance($WPT_{i+1}$; $WPT_{i+2}$), then the trajectory for rejoining the flight plan links the current position of the aircraft to the waypoint $WPT_{i+2}$.

If the distance $D_{i+2}$ is greater than the sum of the rejoining distance $D_{rej(i+1)}$ for $WPT_{i+1}$ and the distance($WPT_{i+1}$; $WPT_{i+2}$), then the trajectory for rejoining the flight plan links the current position of the aircraft to the waypoint $WPT_{i+1}$.

In the third case, that is to say when there is a discontinuity between $WPT_i$ and $WPT_{i+1}$, if there is no discontinuity between $WPT_{i+1}$ and $WPT_{i+2}$ the method according to the invention makes it possible to calculate the rejoining distance $D_{rej(i+2)}$ for the waypoint $WPT_{i+2}$ by way of the "DIRECT TO" function applied to the point $WPT_{i+2}$ If the distance $D_{rej(i+2)}$ is less than the sum of the rejoining distance $D_{rej(i)}$ for $WPT_i$ and the distance($WPT_i$;$WPT_{i+2}$), then the trajectory for rejoining the flight plan links the current position of the aircraft to the waypoint $WPT_{i+2}$. In the converse case the method favours WPTi as homing point for the flight plan.

In these last three cases if there is a discontinuity between $WPT_{i+1}$ and $WPT_{i+2}$, the method favours one of the two waypoints $WPT_i$ or $WPT_{i+1}$ as homing point for the flight plan according to the minimum distance $D_{rej(min)}$.

If several local minima are identified, the method comprises an additional step preliminary to the above-described step of determining the optimal rejoining LEG. This preliminary step makes it possible to test whether the aircraft is undertaking a terminal procedure, and is therefore in a final approach situation. If such is the case, it is necessary for the aircraft to comply with the scheduled descent profile. If there are a certain number of local minima denoted $D_{ML}(j)$ for $j \subset [p+1, N]$ where p is the index of the waypoint corresponding to the upstream end of the current active LEG and N is the index of the last waypoint of the flight plan, the method eliminates the local minima which make it impossible to comply with the aircraft's descent profile. This descent profile is generally determined by criteria specific to the companies and to the aircraft manufacturers. The profile is described by a constant denoted MinDestRWY which represents the minimum distance to be traveled by the aircraft to reach the runway according to the descent profile defined.

The method therefore comprises a step of comparing the distances $D_{ML}(j)$ for $j \subset [p+1, N]$ with the constant MinDestRWY.

If there are indices $j \subset [p+1, N]$ such that $D_{ML}(j)<$MinDestRWY then these local minima are eliminated from the set of local minima processed in the method according to the invention.

From among the list of candidates of local minima meeting the previous condition, the method makes it possible to determine the minimum of the candidates, denoted $D_{ML(min)}$ with $D_{ML(min)}=\text{Min}\{D_{ML(i)}\}_{i \subset [p+1,N]}$.

If there is only a single minimum of the local minima, then it is unique and the method resumes the previously described step of determining the optimal rejoining LEG with the minimum of the local minima $D_{ML(min)}$.

If there are several equal local minima then the method for each of the local minima executes the previously described step of determining the optimal rejoining LEG.

The minimum rejoining distances arising from the calculation of the FMS for each local minimum are compared. Rejoining is performed according to the minimum rejoining distance.

Figure 5:
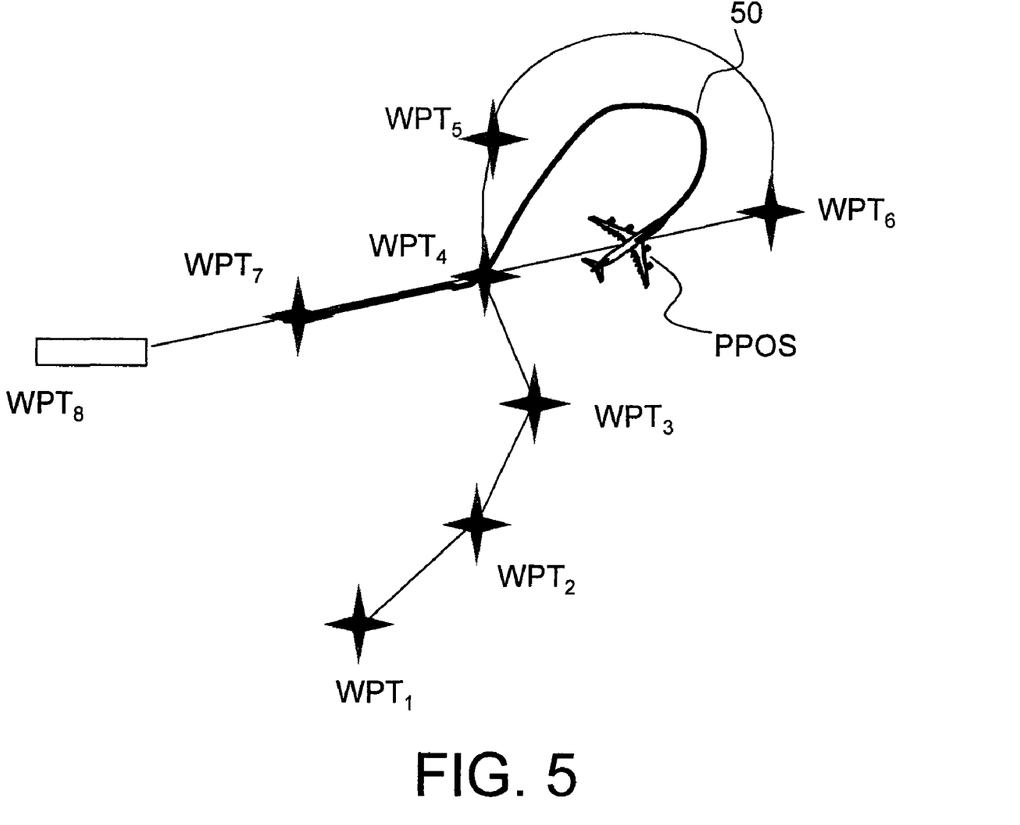
FIG. 5 illustrates a case of approaching an airport comprising several local minima.

FIG. 5 illustrates a typical case of an approach procedure for an airport $WPT_8$. In this example the flight plan makes a loop and the waypoint $WPT_4$ is a node through which the aircraft passes. The aircraft may be equidistant from several waypoints, in the example the waypoints $WPT_4$, $WPT_5$, $WPT_6$.

Following this step, several local minima are determined. The minimum rejoining distance arising from the FMS is that of the trajectory 50. The waypoint $WPT_4$ corresponds to the point at which the aircraft homes in on the flight plan. The method makes it possible to choose the shortest rejoining trajectory from among the distances calculated by the FMS.

The method according to the invention makes it possible to define the LEG selected in the previous steps as "potential".

When $LEG_{i+1}$ (FIG. 4) is selected as potential by the method, several cases are possible for redefining a flight plan.

A first case corresponds to a homing point obtained at the waypoint $WPT_i$ according to the method. In this case, when the aircraft crosses the corridor of the potential $LEG_i$ the latter becomes active. The flight plan is then, under these conditions, redefined on the basis of the waypoint $WPT_i$, however the initial flight plan remains in memory as long as the rejoining of the flight plan is not effective.

From this moment onwards, the principle for rejoining the active LEG is implemented through an interception at 45° for example.

A second case corresponds to a homing point obtained by the method at the waypoint $WPT_{i+1}$. In this case, during the crossing by the aircraft of the sequencing plane 46, $LEG_{i+1}$ becomes the potential LEG, a sequencing plane being a plane perpendicular to a LEG passing through its downstream end.

When the aircraft approaches its flight plan near enough for the conditions for engaging the managed mode to be fulfilled, the FMS then modifies the "active" status of the current active LEG and replaces the potential LEG with a new active LEG, that is to say it establishes a new flight plan whose sequencing starts from the rejoining waypoint.

The method allows the aircraft to disarm the rejoining procedure at any moment, in this case rejoin guidance stops and the system switches back to selected mode. Likewise, if a pilot action modifies the guidance of the aircraft, the system switches to selected mode and again requires a rearming of the managed mode so as to commence a rejoining procedure.

One of the main advantages of such a method resides in its simple implementation and, furthermore, the method requires few actions on the part of the pilot. The latter allows, by engaging the arming of the managed mode, the FMS to find, according to the steps of the method, a rejoining LEG whose rejoining trajectory is optimal. The pilot accepts or declines according to a simple action.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method for assisting an aircraft to rejoin a flight plan, the flight plan defining a path to be followed by the aircraft so as to link a departure airport AD to a destination airport AA, the flight plan being composed of a number N of segments $LEG_i$, a flight segment $LEG_i$ being identified by an index i lying between 1 and N, the index i defining an order of the segment $LEG_i$ in the flight plan, the flight segment $LEG_i$ being defined by a departure end (waypoint $WPT_{i-1}$) and by an arrival end ($WPT_i$), $WPT_0$ corresponding to a geographical departure position AD, $WPT_N$ being a geographical arrival position AA, a waypoint $WPT_i$ being removed from the flight plan once the aircraft has passed through the waypoint $WPT_i$, in a navigation mode termed "managed mode", the aircraft steering towards a waypoint whose index is a minimum, the aircraft having momentarily left the managed mode and having deviated from the flight plan after passing through a waypoint $WPT_{p-1}$, the aircraft occupying a position PPOS and seeking to rejoin the flight plan so as to follow the flight plan in the managed mode, where p is the index of the waypoint corresponding to an upstream end of a current active LEG, the method comprising:

a step of evaluating a separation distance $D_j=D(PPOS, WPT_j)$ between the position PPOS of the aircraft and waypoints $WPT_j$ for any index j lying between p and N;

a step of determining auxiliary indices k lying between p+1 and N−1 for which a separation distance $D_k=Dist(PPOS, WPT_k)$ between the position PPOS of the aircraft and a waypoint $WPT_k$ is less than $D_{k-1}$ and than $D_{k+1}$; and a step of determining a rejoining index $k_{NST}$ from among the auxiliary indices k so as to define a $LEG_{k_{NST}}$, termed potential, on the basis of which a new flight plan is established when the aircraft passes in proximity to the $LEG_{k_{NST}}$.

2. The method according to claim 1, wherein the separation distance $D_j=D(PPOS, WPT_j)$ between the position PPOS of the aircraft and a waypoint $WPT_j$ corresponds to a distance measurement in a vertical plane.

3. The method according to claim 1, wherein the separation distance $D_j=D(PPOS, WPT_j)$ between the position PPOS of the aircraft and a waypoint $WPT_j$ is a distance measurement in a horizontal plane.

4. The method according to claim 1, wherein the separation distance $D_j=D(PPOS, WPT_j)$ between the position PPOS of the aircraft and a waypoint $WPT_j$ is a measurement of Euclidean distance type in a 3-dimensional space.

5. The method according to claim 4, wherein the step of determining the rejoining index $k_{NST}$ consists in determining $k_{NST}$ as a minimum of the auxiliary indices k.

6. The method according to claim 5, wherein a first rejoining distance $D_{rej(k_{NST})}$ is calculated automatically by FMS Flight Management System FMS between the position PPOS of the aircraft and a waypoint $WPT_{k_{NST}}$.

7. The method according to claim 6, wherein a second rejoining distance $D_{rej(k_{NST}+1)}$ is calculated automatically by the FMS between the position PPOS of the aircraft and a waypoint $WPT_{k_{NST}+1}$.

8. The method according to claim 7, wherein the minimum of the first and the second rejoining distance is determined, denoted $D_{rej(min)}$.

9. The method according to claim 8, wherein a third rejoining distance $D_{rej(k_{NST}+2)}$ is calculated automatically by the FMS between the position PPOS of the aircraft and a waypoint $WPT_{k_{NST}+2}$.

10. The method according to claim 9, wherein the third rejoining distance is compared with a fourth distance obtained by summing the distance $D_{rej(min)}$ and the distance $Dist(WPT_{k_{NST}+1}, WPT_{k_{NST}+2})$, the shorter distance from among the third rejoining distance and the fourth distance being chosen so as to rejoin the flight plan.

11. The method according to claim 9, wherein if there is a lateral discontinuity between the waypoints $WPT_{k_{NST}-1}$ and $WPT_{k_{NST}}$, then the third rejoining distance $D_{rej(k_{NST}+2)}$ is compared with a fifth distance by summing the second rejoining distance $D_{rej(k_{NST}+1)}$ and a distance $Dist(WPT_{k_{NST}+1}, WPT_{k_{NST}+2})$, the shorter distance from among the third rejoining distance and the fifth distance being chosen so as to rejoin the flight plan.

12. The method according to claim 7, wherein automatic calculation of the rejoining distance by the FMS comprises a first trajectory part calculated with heading fixed towards a downstream waypoint of a selected rejoining LEG and a second part is calculated with heading fixed according to a predetermined angle with the selected rejoining LEG.

13. The method according to claim 12, wherein the predetermined angle is 45°.

14. The method according to claim 12, comprising, when an operator of the aircraft has accepted the rejoining proposal and when the aircraft has passed through the waypoint $WPT_{k_{NST}}$, a step of substituting a current flight plan $WPT_p$, $WPT_{p+1}, \ldots, WPT_N$ with a new flight plan $WPT_{k_{NST}+1}$, $WPT_{k_{NST}+2}, \ldots, WPT_N$, the potential $LEG_{k_{NST}}$ becoming the active LEG.

15. The method according to claim 14, comprising, when the operator of the aircraft has accepted the rejoining proposal and when the aircraft has crossed a sequencing plane of a $LEG_{k_{NST(min)}}$, the sequencing plane of the $LEG_{k_{NST(min)}}$ being the plane perpendicular to the $LEG_{k_{NST(min)}}$ passing through the downstream end of the $LEG_{k_{NST(min)}}$, $k_{NST}(min)$ being the minimum index of the auxiliary indices, a step of substituting the current flight plan $WPT_p, WPT_{p+1}, \ldots, WPT_N$ with a new flight plan $WPT_{k_{NST}+2}, WPT_{k_{NST}+2}, \ldots, WPT_N$, the potential $LEG_{k_{NST}}$ becoming the active LEG.

* * * * *